United States Patent [19]

Utano et al.

[11] 4,144,409

[45] Mar. 13, 1979

[54] MOBILE RADIO COMMUNICATION CONTROL SYSTEM FOR PREVENTING ERRONEOUS RECEPTION OF CONTROL SIGNALS

[75] Inventors: Takanori Utano, Yokohama; Masayuki Sakamoto, Yokosuka; Yoshikazu Takayama, Tokyo, all of Japan

[73] Assignees: Nippon Telegraph and Telephone Public Corporation; Nippon Electric Co., Ltd., both of Tokyo, Japan

[21] Appl. No.: 829,111

[22] Filed: Aug. 30, 1977

[30] Foreign Application Priority Data

Aug. 30, 1976 [JP] Japan ............................ 51-102606

[51] Int. Cl.² .......................................... H04Q 7/04
[52] U.S. Cl. .................................... 179/2 EB; 325/55
[58] Field of Search ................ 179/2 EB; 325/53, 55

[56] References Cited

U.S. PATENT DOCUMENTS

| 3,582,787 | 6/1971 | Muller et al. | 179/2 EB |
| 4,025,853 | 5/1977 | Addeo | 325/55 |

FOREIGN PATENT DOCUMENTS

| 2056093 | 5/1972 | Fed. Rep. of Germany | 179/2 EB |
| 2631517 | 3/1977 | Fed. Rep. of Germany | 325/53 |

*Primary Examiner*—Kathleen H. Claffy
*Assistant Examiner*—Kenneth A. Chayt
*Attorney, Agent, or Firm*—Sughrue, Rothwell, Mion, Zinn and Macpeak

[57] ABSTRACT

A mobile radio communication system utilizes message channels of the same frequencies in separate geographic zones. Also, zones utilizing the same message channels are assigned distinguishing control codes which are transmitted with control signals to prevent control signals related to one zone from interfering with communications with another zone using the same message frequencies.

2 Claims, 7 Drawing Figures

MOBILE RADIO COMMUNICATION CONTROL SYSTEM FOR PREVENTING ERRONEOUS RECEPTION OF CONTROL SIGNALS

BACKGROUND OF THE INVENTION

The present invention relates to a mobile radio communication system such as a broad-zone automobile radio telephone system or the like, and more particularly, to a mobile radio communication control system capable of preventing base stations and/or mobile units from erroneously receiving control signals of other zones caused by interference with electromagnetic waves from the other zones.

Heretofore, in the above-referred type of mobile radio communication systems such as the one proposed in U.S. Pat. Nos. 3,898,390 or 4,028,500, a plurality of small zones respectively assigned to a plurality of base stations are combined to form a control zone, and a plurality of control zones jointly form a service area of a mobile radio communication system. To the plurality of small zones in each control zone are assigned different radio frequencies (message channels), and in these different control zones, the same radio frequencies are assigned to mutually corresponding small zones. Furthermore, it is a common practice that the mobile units in the service area are generally controlled by means of a common control channel from a stand-by state up to commencement of conversation, and control signals for switching message channels of the mobile units or for clearing a communication are transmitted and received by means of a message channel.

Figure 1:
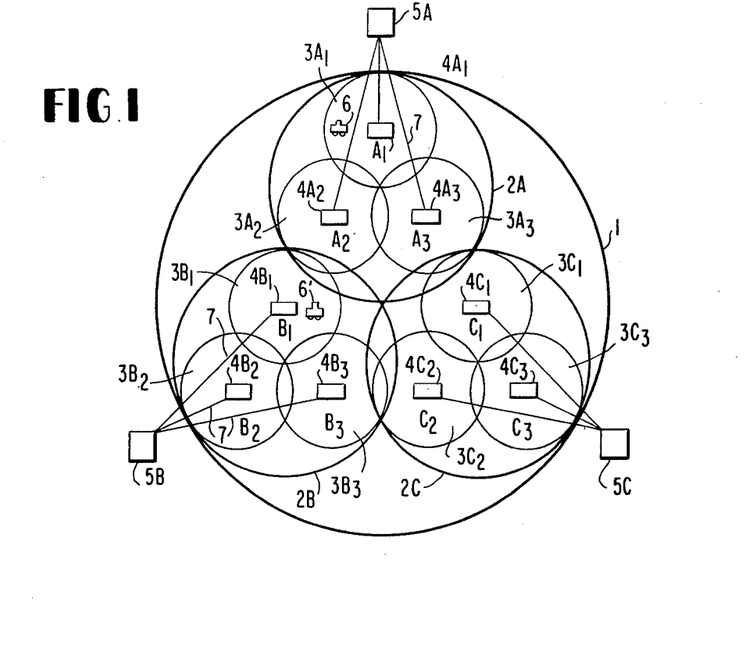
FIG. 1 is a schematic illustration of a construction of a service area in a mobile radio communication system.

In the above-described zone system, mobile units which are talking through the same message channels can exist in a small zone (for instance, small zone $3A_1$, as will be described later) within a certain control zone (for instance, control zone 2A as will be described later) as well as in a small zone (for instance, small zone $3B_1$, as will be described later) within another control zone (for instance, control zone 2B as will be described later) corresponding to the small zone $3A_1$. Therefore, if a clearing control signal transmitted from a mobile unit which has terminated conversation in the small zone $3A_1$ should be erroneously received by a base station (for instance, base station $4B_1$) of the other small zone $3B_1$ through the same message channel, then a control station (for instance, control station 5B) controlling this base station $4B_1$ would perform a clearing operation in response to the termination of conversation at the mobile unit in the small zone $3B_1$. Accordingly, there is a disadvantage that the mobile unit in the small zone $3B_1$ is erroneously disconnected from communication.

Conversely, if a 'disconnecting' control signal transmitted from the base station of the small zone $3A_1$ to a mobile unit in the same small zone through a message channel should be erroneously received by another mobile unit in another small zone $3B_1$ that is talking through the same message channel, the communication at the mobile unit in the small zone $3B_1$ is disconnected because the mobile unit in the small zone $3B_1$ performs disconnection processing as a clearing operation due to earlier hang-up by the general subscriber.

In addition, upon channel switching with communication also, a similar problem would occur. More particularly, in case where for a mobile unit in the small zone $3A_1$ is designated another message channel for a different small zone (for instance small zone $3A_2$) within the control zone 2A by means of a channel through which the mobile unit has been talking, a mobile unit in the small zone $3B_1$ may erroneously receive this control signal for designating a message channel and thus may switch its channel to the message channel for the small zone $3A_2$, so that normal communication would become impossible.

In order to prevent such electromagnetic wave interferences from another control zone, heretofore, it has been the practice to arrange the small zones $3A_1$ and $3B_1$ employing the same message channels sufficiently far apart from each other. However, in order the enhance the reliability of communication, it is necessary for this approach to increase the number of small zones within a control zone. In other words, the number of message channels must be increased to accommodate the increase of the small zones.

On the contrary, assuming that the total number of the assigned message channels is fixed, then the number of message channels for each small zone is decreased, reducing the number of mobile units which can be simultaneously serviced in each small zone.

SUMMARY OF THE INVENTION

Therefore, it is a principal object of the present invention to provide a mobile radio communication system which is free from the above-described disadvantages, and in which mobile units talking in different control zones respectively through the same message channels are prevented from being erroneously controlled.

According to one feature of the present invention, there is provided a mobile radio communication control system for a plurality of base stations in which a service area is established by disposing a plurality of first zones each having a plurality of second zones for a plurality of base stations in which different message channels are assigned respectively to the plurality of second zones within each said first zone, the same message channels being assigned to mutually corresponding second zones within different first zones, respectively, and in which control signals for switching of message channels or for clearing are transmitted and received through the message channels between the plurality of mobile units and the base stations in said service area, characterized in that said control signal is provided with an identifying code for discriminating between each said first zone.

BRIEF DESCRIPTION OF THE DRAWINGS

Above-mentioned and other features and objects of this invention will become more apparent by reference to the following description taken in conjunction with the accompanuing drawings, in which.

DETAILED DESCRIPTION OF THE PREFERRED EMBODIMENTS

Referring now to FIG. 1 of the drawings, reference numeral 1 generally denotes a service area which may possibly extend over the whole country in the case of a public mobile radio communication system. Reference numerals 2A, 2B and 2C (hereafter represented merely by numeral 2 when designating the zones generally) denote control zones. In order to achieve effective utilization of radio frequencies and economy of the system, the service area 1 is covered by a plurality of control zones 2 in which the same radio frequencies (message channels) are used repeatedly in relatively close regions. The respective control zones 2 are composed of a plurality of small zones $3A_1$, $3A_2$, $3A_3$, $3B_1$, $3B_2$, $3B_3$, $3C_1$, $3C_2$ and $3C_3$ (hereafter represented merely by numeral 3). The respective small zones 3 are determined so as to have such extent that the transmitting power of the mobile unit therein is sufficient to enable the mobile unit to communicate with the base station. Each of the small zones 3 is assigned one or more message channels. Reference numeral 4 ($4A_1$, $4A_2$, $4A_3$, $4B_1$, $4B_2$, $4B_3$, $4C_1$, $4C_2$ and $4C_3$) denotes base stations installed in the corresponding small zones 3. Reference numeral 5 (5A, 5B and 5C) designates control stations in the corresponding control zones 2. In order to jointly control all the base stations within each control zone 2, normally each control station is connected to the respective base stations in the corresponding control zone 2 through wire lines 7. Reference numerals 6 and 6' denote mobile units. It is to be noted that the present invention is also applicable to a modified service area construction that is different from the model shown in FIG. 1. As one modification the control stations are can be disposed in such a manner that the plurality of control zones 2A, 2B and 2C are jointly controlled or a control zone is controlled as divided into two or more smaller zones The message channels assigned to the respective small zones 3 are different, as a rule. However, in order to effectively utilize the radio frequencies, the same radio frequencies (message channels) are repeatedly used as well known. For instance, as to the model shown in FIG. 1, although the message channels used in the small zones $3A_1$, $3A_2$ and $3A_3$ are all different from each other, often the message channels used in the zone $3A_1$ are identical to the message channels used in zone $3B_1$ or $3C_1$. Also, very frequently, the message channels used in small zones $3A_2$, $3B_2$ and $3C_2$ or $3A_3$, $3B_3$ and $3C_3$ are the same. Thus it is a common practice that generally, each control zone 2 is composed of a plurality of small zones 3 which are assigned with the same message channels for the respective control zone 2, and that the service area 1 is covered by repeatedly employing these control zones 2.

Figure 2:
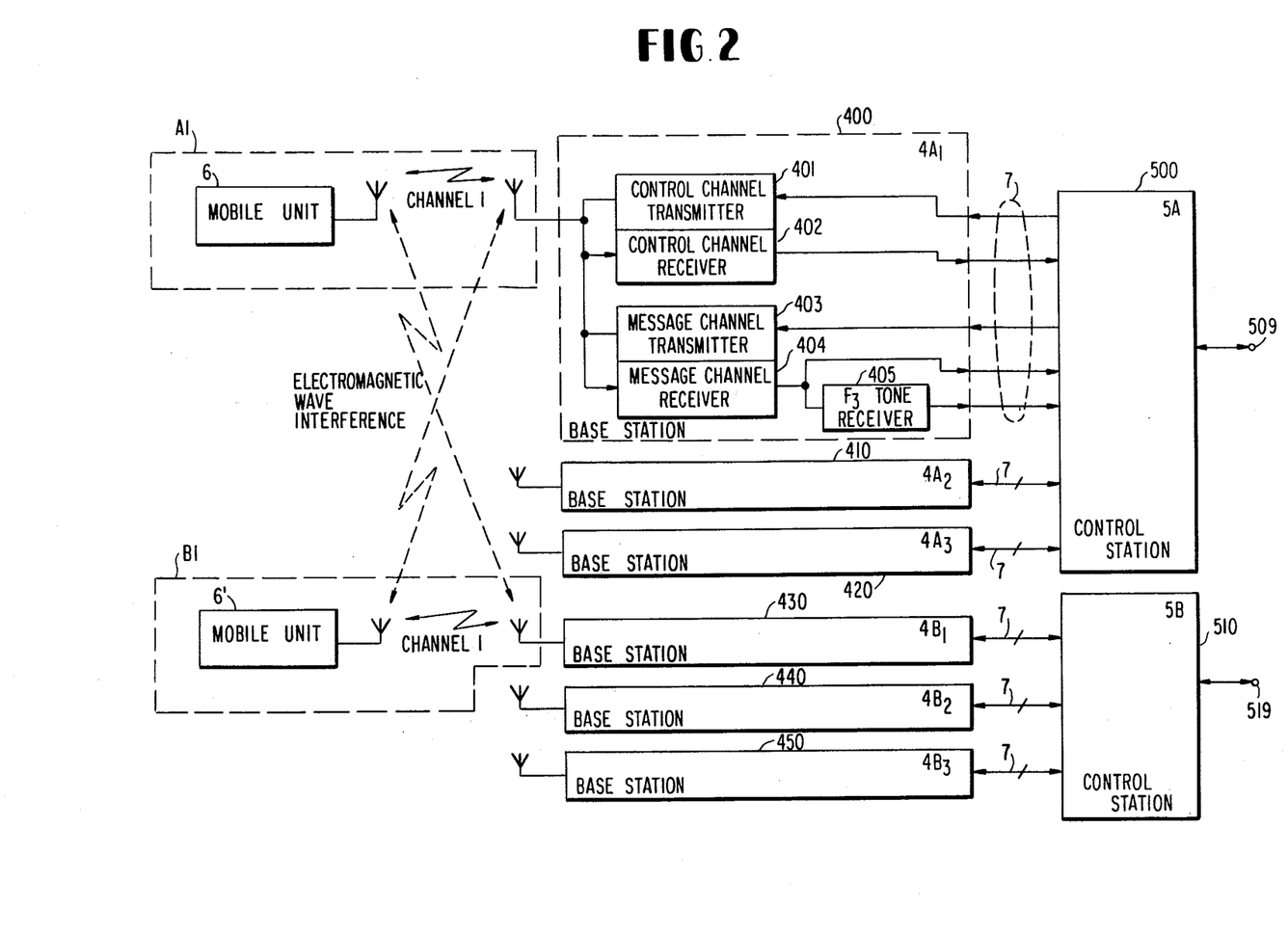
FIG. 2 is a block diagram of one preferred embodiment of the present invention.
Figure 3:
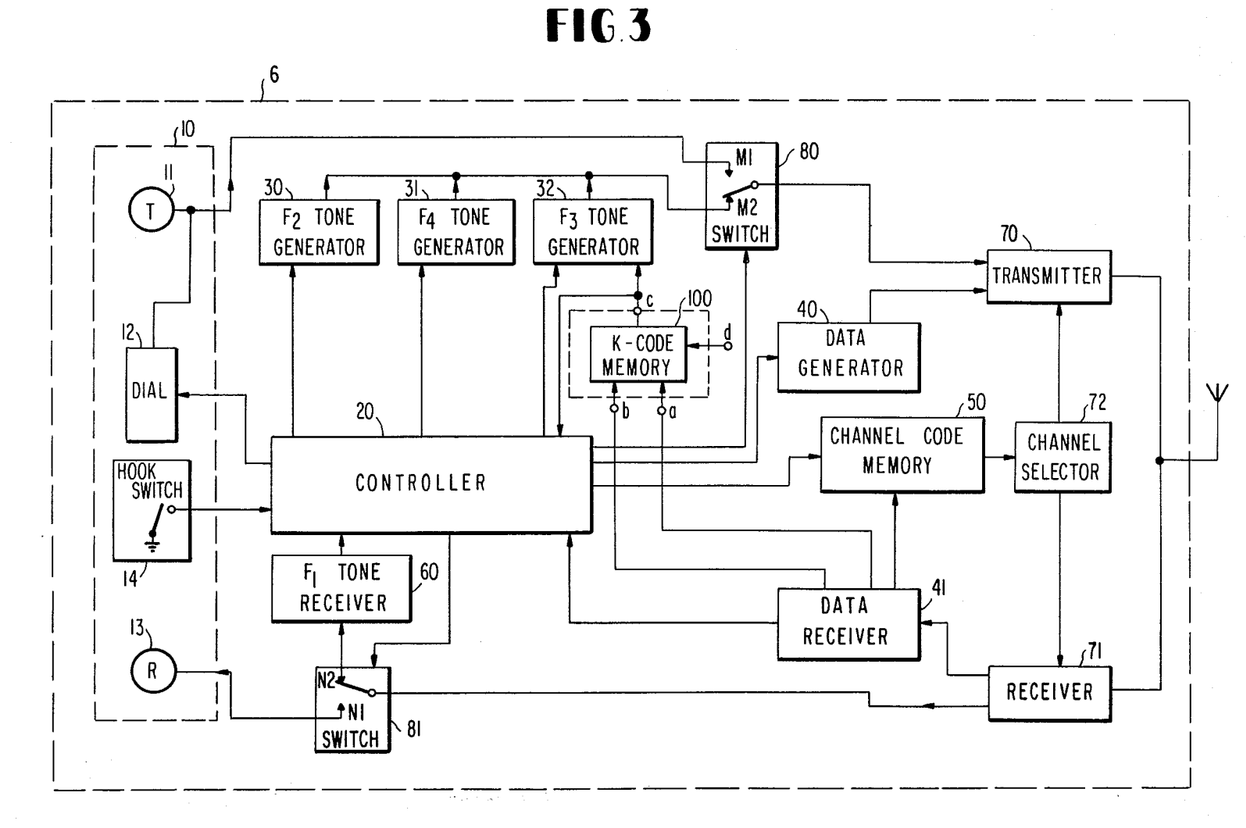
FIG. 3 is a more detailed block diagram of a mobile unit shown in FIG. 2.
Figure 4A:
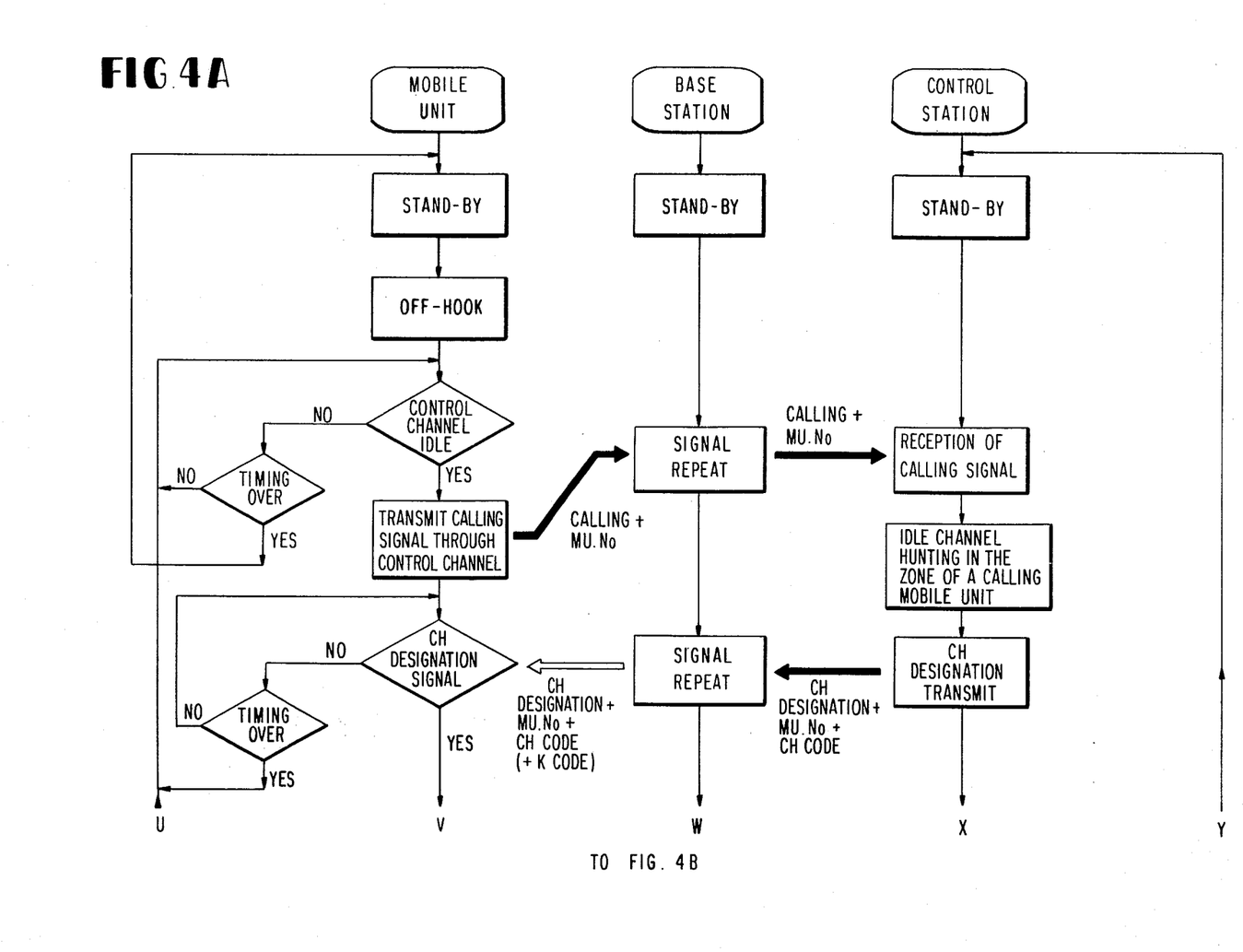
FIGS. 4A, 4B and 4C are flow charts illustrating a calling operation and a clearing operation in the mobile radio communication system according to the present invention.
Figure 4B:
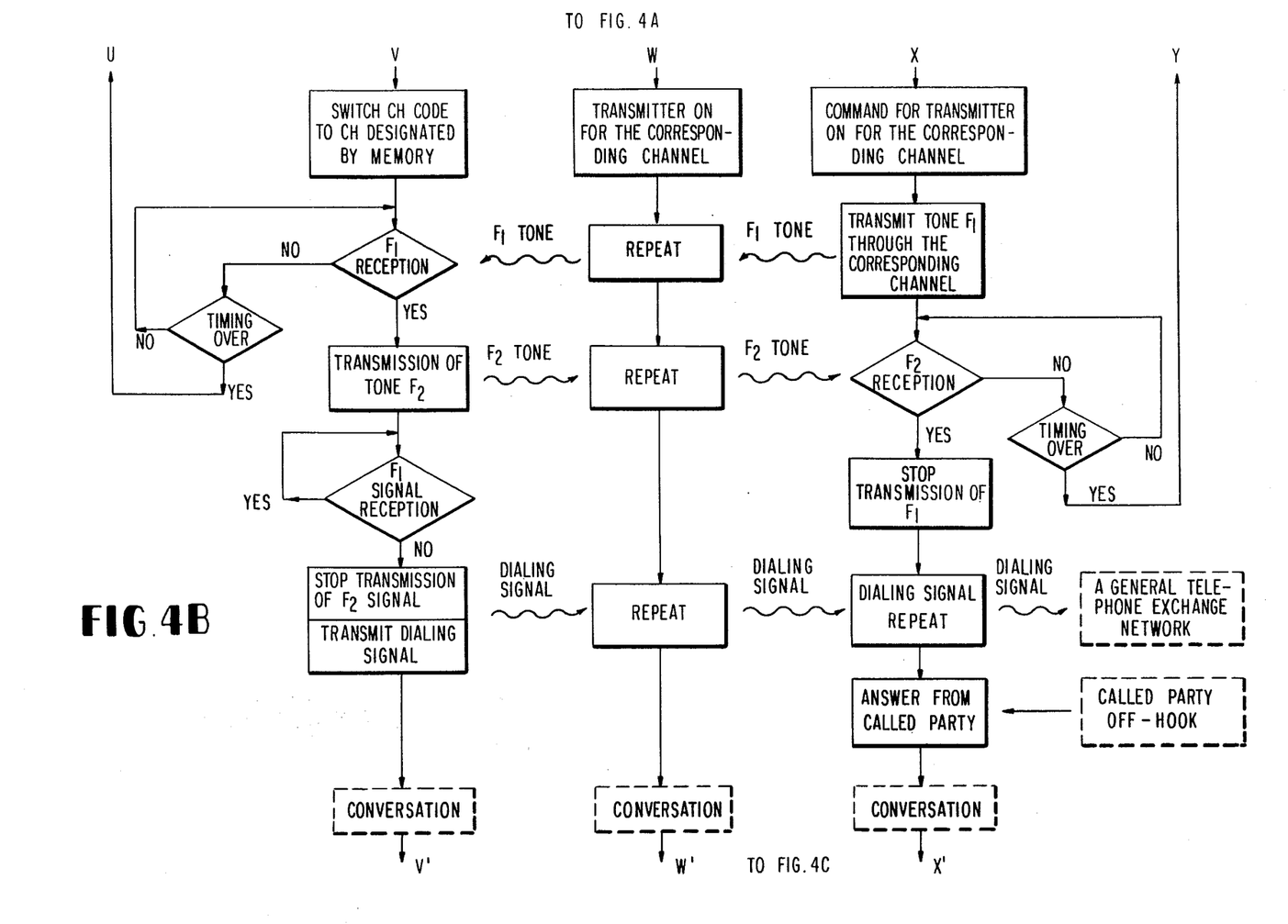
Figure 4C:
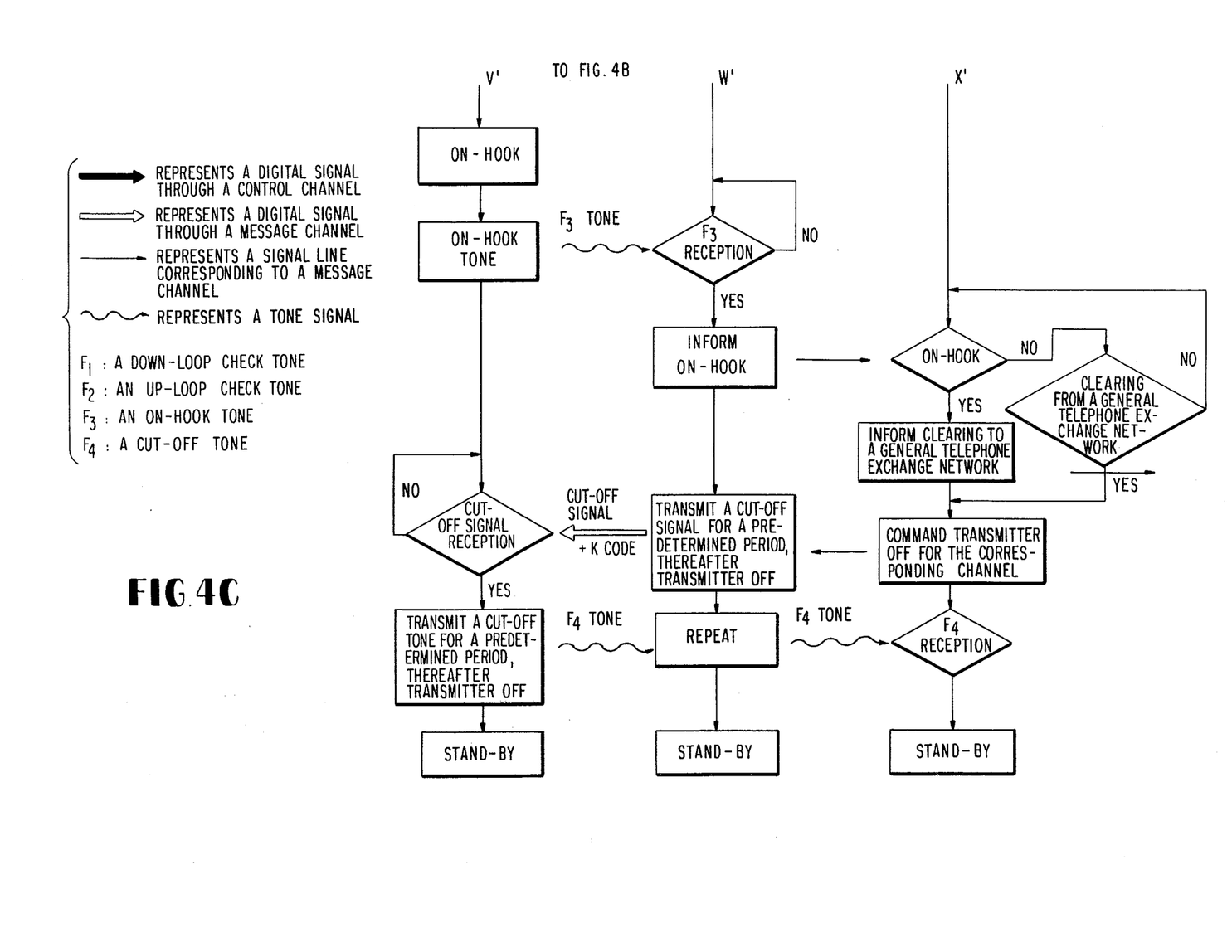

A block diagram of one preferred embodiment of the mobile radio communication system according to the present invention is shown in FIG. 2, and a more detailed block diagram of the mobile unit in FIG. 2 is shown in FIG. 3. With reference to FIG. 2, reference numerals 400, 410, 420, 430, 440 and 450 denote base stations; numeral 401, a transmitter for transmitting a digital signal through a control channel; and numeral 402, a receiver for receiving the digital signal through the control channel. Reference numeral 403 denotes a message channel transmitter; 404, a message channel receiver; 405, a tone receiver for receiving an on-hook tone (a control signal for clearing)$F_3$ from a mobile unit; 500 and 510, control stations; and 509 and 510, terminals for connecting to common telephone exchange offices.

With reference to FIG. 3, reference numeral 10 denotes a telephone set; 11, a telephone transmitter; 12, a dial; 13, a telephones receiver; 14, a hook-switch; 20, a sequence controller of a mobile unit; 30, an $F_2$ tone generator for generating a tone $F_2$ to be used to check an up-loop (mobile unit→base station→control station); 31, an $F_4$ tone generator for generating a cut-off tone $F_4$; 32, an $F_3$ tone generator for generating an on-hook tone $F_3$; 40, a transmission data generator; 41, a data receiver; 50, a memory circuit for storing a channel being used; 60, an $F_1$ tone receiver for receiving a tone $F_1$ to be used to check a down-loop (control station→base station→mobile unit); 70, an r.f. transmitter; 71, an r.f. receiver; 72, a channel selector; and 80 and 81, transfer switches.

At first, operation of the heretofore known system will be described with reference to FIGS. 2, 3, 4A, 4B and 4C.

Now it is assumed that a mobile unit 6 has entered a calling operation by transferring the hook-switch 14 to its OFF-HOOK position in the zone $3A_1$ in FIG. 1. Upon entering the calling operation, the mobile unit 6 checks if a common control channel is idle or not. If it is idle, a calling signal consisting of a calling code and a mobile unit number is generated by the data generator 40 and is passed to the transmitter 70, and the calling signal is transmitted from the mobile unit to the base station through the common control channel. Then the mobile unit 6 waits for a channel designation signal from the control station 500 that is transmitted back through the common control channel.

At the base station 400, the signal from the mobile unit 6 is received by the common control channel receiver 402 and is repeated to the control station 500 through a wire line 7.

At the control station 500, as soon as the calling signal is received, an idle message channel for the zone where the mobile unit 6 has originated a call (in this instance, the zone $3A_1$), is selected. In order to inform the mobile unit 6 of the selected message channel, a channel designation signal consisting of a channel designation code (CH.D), a mobile unit number (MU.No.) and a channel code (CH.C) of the message channel, is transmitted through the common control channel. In addition, for the purpose of emitting an electromagnetic wave from the message channel transmitter 403 located in the designated base station, the control station 500 transmits a transmission command through a signal line corresponding to the designated message channel. At the same time, a tone $F_1$ to be used for checking the down-loop to confirm that the mobile unit has switched its channel to the designated message channel, is sent from the $F_1$ tone generator in the control station 500 to the message channel transmitter 403.

At the base station 400, the data sent through the wire line 7 is transmitted by the common control channel transmitter 401, and thereby the channel designation signal can be repeated. In addition, a designated message channel transmitter 403 is actuated by the signal line corresponding to the designated message channel, and thereby the tone $F_1$ is repeated through the message channel.

At the mobile unit 6, the signal is received by the data receiver 41 via the receiver 71. Whether or not this channel designation signal (control code plus mobile unit number) is pertinent to its own unit is checked by the controller 20. If it is indeed the channel designation signal for its own unit, then the channel code is stored in the channel code memory 50 and is sent to the channel selector 72. The receiver channel of the mobile unit is then switched to the message channel designated through the common control channel. If the mobile unit has been correctly switched to the designated channel, then the aforementioned down-loop check tone $F_1$ sent from the control station 500 can be received by the $F_1$ tone receiver 60 (composed of a tuning circuit and a detector circuit). If the tone $F_1$ has been correctly received by the mobile unit 6, then an up-loop check tone $F_2$ is transmitted from the $F_2$ tone generator 30. At the same time, the transmitter 70 is actuated. Thereafter the transmitter 70 would continuously emit a transmitting electromagnetic wave until the conversation terminates.

At the base station 400, the tone $F_2$ transmitted from the mobile unit is received by the message channel receiver 404, and it is repeated to the control station 500 through the wire line 7.

At the control station 500, when this up-loop check tone $F_2$ is detected, it can be confirmed that the mobile unit 6 has been correctly switched to the designated message channel, so that the down-loop check tone $F_1$ is interrupted and the control station 500 is ready to repeat dialing signals.

At the mobile unit 6, after the interruption of the tone $F_1$ has been confirmed, the tone $F_2$ is interruption. Then the switch 80 is transferred to the side of the telephone transmitter 11, and the switch 81 is transferred to the side of the telephone receiver 13. Thereby the dial 12 is enabled. A dialing signal is repeated by the base station 400 and the control station 500, and then it serves to ring a called subscriber through a general telephone exchange network. When the called subscriber responds, conversation becomes possible.

If the mobile unit 6 goes ON-HOOK during conversation, then a clearing operation due to earlier hang-up by the mobile unit is initiated. Now this operation will be described with reference to FIG. 4C. At first, the switch 80 is transferred from the side $M_1$ of the telephone transmitter 11 to the side $M_2$ of the tone generators, and the switch 81 is transferred from the side $N_1$ of the telephone receiver 13 to the side $N_2$ of the tone receiver. Then, the ON-HOOK tone $F_3$ is transmitted from the $F_3$ tone generator 32 through the message channel. Here it is to be noted that in the prior art this ON-HOOK tone has a particular frequency that is common to all the mobile units (The K-code memory 100 shown in FIG. 3 is an element newly added according to the present invention.)

At the base station 400, when the tone $F_3$ is received by the $F_3$ tone receiver 405, it is informed to the control station 500 through a signal line corresponding to the message channel.

At the control station 500, as soon as it knows the ON-HOOK condition of the mobile unit 6, a clearing operation is carried out. At first, the ON-HOOK condition is informed to the general telephone exchange network, and subsequently, in order to disconnect the mobile unit 6, a signal for interrupting the operation of the transmitter for the message channel that is being used in the base station 400 is transmitted from the control station 500 through a signal line corresponding to the message channel.

At the base station 400, in response to the signal for interrupting the operation of the message channel transmitter 403, a digital cut-off signal is transmitted for a predetermined period of time and then the transmission of the electromagnetic wave is stopped. The cut-off signal has a cut-off code that is the same for all the message channels.

At the mobile unit 6, as soon as this cut-off signal is received, the cut-off tone $F_4$ is transmitted from the tone generator 31 for a predetermined period of time, the channel is switched to the common control channel, and the mobile unit 6 returns to a stand-by state.

At the base station 400, the tone $F_4$ is repeated to the control station 500, where the cut-off tone $F_4$ is detected and thereby it is informed that the mobile unit 6 has returned to a stand-by state, so that the message channel is returned to a stand-by state.

In the case of the clearing operation due to earlier hang-up by the general subscriber, the clearing operation is commenced in response to reception of a clearing signal from the general telephone exchange network. In this clearing operation, the control station 500 transmits a cut-off signal through a signal line corresponding to the message channel being used to interrupt the operation of the message channel transmitter in the base station 400. Then, the subsequent operations are the same as those in the case of the earlier hang-up by the mobile unit.

In the above-described type of mobile radio communication system, as the mobile unit moves, sometimes it may go out of the small zone for the channel through which it is talking. In such a case, the conversation can be continued by switching the message channel to another message channel for a new small zone.

After the control station 500 has been informed that the mobile unit 6 moved into a new small zone, an idle message channel for the new small zone is selected. Then the control station 500 transmits a talking channel switching signal for informing a new message channel code to the mobile unit 6, via the base station 400 and by making use of the message channel through which the mobile unit 6 is then talking. Exactly in the similar manner to the case of originating a call, loop check operations are conducted through the newly designated message channel.

The respective operations in the prior art system described above have the following disadvantages. In a small zone $3B_1$ within another control zone 2B which small zone uses the same message channels as the small zone 3A, there can exist a mobile unit 6' that is talking through the same message channel (for instance, channel No. 1) as the mobile unit 6 in the small zone $3A_1$. If the ON-HOOK tone $F_3$ transmitted from the mobile unit 6 should be erroneously received by the base station 430 of the small zone $3B_1$, then the $F_3$ tone receiver 405 in the base station 430 would operate. As a consequence, the control station 510 would conduct a clearing operation on the basis of misunderstanding that the mobile unit 6' has terminated conversation, so that the mobile unit 6' would be erroneously disconnected from communication. On the other hand, if a cut-off signal transmitted from the base station 400 of the small zone $3A_1$ to the mobile unit 6 should be erroneously received by a mobile unit 6', then the mobile unit 6' would carry out processing for disconnection. Upon channel switching during conversation also, the same operations would occur. More particularly, when a message channel for the small zone $3A_2$ is designated for the mobile unit 6, if the channel switching signal should be erroneously received by the mobile unit 6', then the mobile unit 6' would switch the message channel through which it has been talking, and thereby normal conversation would become impossible.

Figure 5:
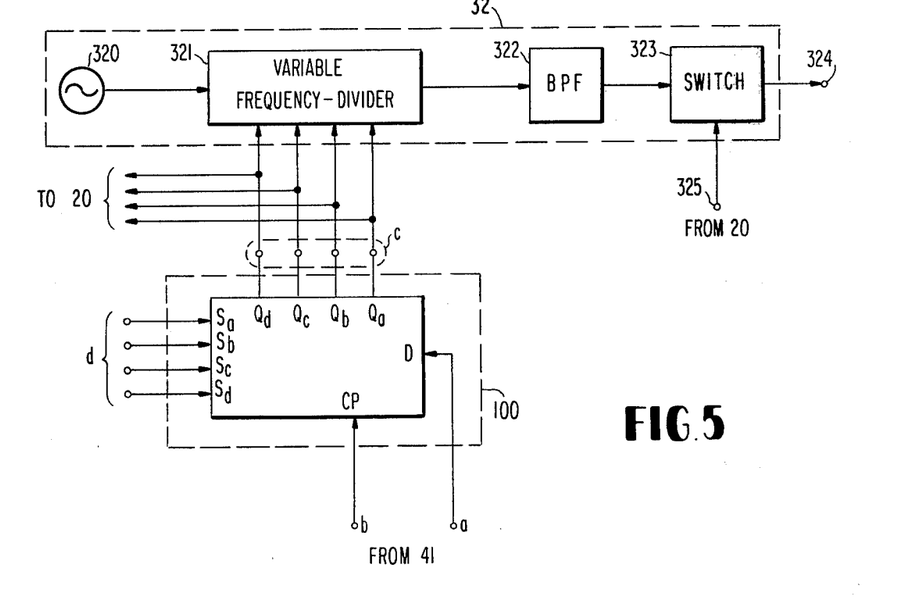
FIG. 5 is a more detailed block diagram of an F3 tone generator and a K-code memory shown in FIG. 3.

Now one preferred embodiment of the present invention will be described with reference to FIGS. 2, 3, 4A, 4B, 4C and 5. In FIG. 3, the K-code memory 100 is newly added according to one feature of the present invention. This K-code memory 100 serves to store an identifying code for the control zones 2A, 2B and 2C, that is, a K-code. This K-code is transmitted from the control station 500 in association with the channel designation signal upon originating a call, terminating a call and channel switching during conversation. This K-code is received by the data receiver 41, then applied to a terminal a of the K-code memory 100, and is stored in the K-code memory in response to a clock signal applied to a terminal b. If necessary, the K-code memory can be set manually through a terminal d. A more detailed circuit construction of the K-code memory 100 and the $F_3$ tone generator 32 is shown in FIG. 5. In this figure, the output of an oscillator 320 is fed to a variable frequency divider 321. The variable frequency divider 321 has its frequency dividing factor determined by the K-code memory 100. By way of example, it is assumed that the oscillator 320 oscillates at a frequency of 48KHz. The K-code is assumed to have values of, for example, 1 to 7, and further it is assumed that the variable frequency divider 321 divides the oscillating frequency of the oscillator 320 by a factor of "K-code + 20". Accordingly, the divided frequency is about 2285.7Hz when the K-code is 1, and about 1777.8Hz when the K-code is 7. The output of the variable frequency divider 321 has its higher harmonics removed by a band-pass filter 322, and then it is delivered at an output terminal 324 as the $F_3$ tone depending upon the state of the control signal at an input terminal 325 that is furnished from the controller 20.

The $F_3$ tone receiver 405 in the base station was, heretofore, turned to a fixed frequency all over the service area. However, according to the present invention, by varying the frequencies of the $F_3$ tone to be received in the respective control zones 2A, 2B and 2C, the discrimination of the respective control zones can be effected.

Among the operations of the mobile radio communication control system according to the present invention, only the operations which are different from those in the prior art system will be described hereunder.

At first it is to be noted that the channel designation signal transmitted from the control station to the mobile unit via the base station upon originating a call, is composed of a channel designation code (CH, D, C), a mobile unit number (MU. No.), a message channel code (CH. C) and a control zone code K. At the mobile unit 6, when the channel designation signal has been received, the channel code is stored in the channel code memory, and the K-code is stored in the K-code memory 100.

Secondly, upon clearing operation due to earlier hang-up by the mobile unit, when the mobile unit goes ON-HOOK, similarly to the prior art system an ON-HOOK tone $F_3$ is transmitted from the tone generator 32 as a clearing signal. However, in this instance, the frequency of the ON-HOOK tone $F_3$ is determined by the K-code stored in the K-code memory 100. At the base station 400, in response to a signal transmitted from the control station 500 for interrupting the operation of the message channel transmitter 403, a digital cut-off signal is transmitted for a predetermined period of time. This cut-off signal is composed of a cut-off code and a K-code characteristic of each control zone. At the mobile unit 6, the K-code contained in the received cut-off signal is compared and checked with the K-code stored in the memory 100 by means of the controller 20, and if they are coincident with each other, processing for disconnection is carried out.

In a clearing operation due to earlier hang-up by the general subscriber also, the base station transmits a cut-off signal consisting of a cut-off code and a K-code to the mobile unit. At the mobile unit 6, the K-code contained in the received cut-off signal is compared with the K-code stored in the memory 100 by means of the controller 20, and when they coincide with each other, processing for disconnection is carried out.

Thirdly, upon channel switching during conversation, in order to inform the mobile unit 6 of a new channel code, by making use of the message channel through which the mobile unit 6 is then talking, the control station 500 transmits to the mobile unit 6 via a base station 400 a talking channel switching signal composed of a channel switching code, a K-code of the message channel through which the mobile unit is then talking (an old K-code), a channel code of the new message channel and a K-code of the new message channel (a new K-code). At the mobile unit 6, the old K-code contained in the received talking channel switching signal and the K-code stored in the memory 100 are compared with each other, and if they are coincident with each other, then the new channel code is stored in the channel code memory 50, while the new K-code is stored in the K-code memory 100, and thereby the switching operation for the talking channels can be effected.

Owing to the use of the K-code, the disadvantages in the prior art system can be obviated as described below. Assume that a small zone $3B_1$ using the same message channels as the small zone $3A_1$, there exists a mobile unit 6' that is talking through the same message channel (for instance, channel No. 1) as the mobile unit 6 in the small zone $3A_1$. Further assume that the ON-HOOK tone $F_3$ from the mobile unit 6 is erroneously received by the base station 430 of the small zone $3B_1$. Despite the latter the $F_3$ tone receiver 405 in the base station 430 will not operate to perform the clearing operation because the $F_3$ tone receiver 405 detects a tone frequency corresponding to the K-code that is characteristic of the control zone 2B different from the control zone 2A. Therefore, erroneous disconnection does not occur. In addition, even if a cut-off signal transmitted from the base station 400 of the small zone $3A_1$ to the mobile unit 6 in the same small zone $3A_1$ should be erroneously received by a mobile unit 6' in small zone $3B_1$ the latter mobile unit will not conduct the processing for disconnection because the received K-code is different from stored in the K-code memory 100. The same is also true about channel switching during conversation. More particularly, if the signals destined for mobile unit 6 to cause a switching of message channels are erroneously received by mobile unit 6', they will not be processed as a channel switching instruction in the mobile unit 6' because the K-codes do not coincide with each other, and therefore, the conversation can be continued.

As described above, according to the present invention, in a mobile radio communication control system having a service area construction in which the same message channels are repeatedly used in different control zones, by providing a discrimination in a control signal for each control zone, faulty operations caused by electromagnetic wave interferences between the same message channels upon clearing and upon channel switching during conversation can be prevented, the radio frequencies can be utilized effectively, and the number of accommodated mobile units can be increased. At the mobile unit, by the provision of a memory circuit and a tone oscillator, completely automated discrimination of control zones can be effected, and application to a public mobile radio communication system is made possible.

What is claimed is:

1. A communication control system for a mobile radio communication network of the type having a plurality of base stations arranged in groups, each base station serving a respective small communication zone to provide wireless message channels for mobile units present in said respective small communication zone, at least one control station serving a large communication zone and connected to a group of said base stations within said large zone for receiving and transmitting clearing, cut-off and switching signals from and to said mobile units through said message channels, said message channels being provided by carrier waves of frequencies which are different for each base station within a group but common for certain base stations within different groups, characterized in that each of said mobile units includes memory means for storing a unique identifying code assigned to each of said base stations having message channels of common carrier wave frequencies, means for generating said clearing signal corresponding at least in part to said stored identifying code, means for transmitting through a message channel a carrier wave modulated by said clearing signal, at the termination of a conversation, means for receiving a carrier wave modulated by one of said cut-off and switching signals containing said identifying code, and means for comparing said stored identifying code with said received one to provide a signal for controlling said message channel, said base stations further including means for receiving and detecting said clearing signal, each said mobile unit receiving during call set-up an identifying code transmitted from and uniquely identifying the base station providing the message channel on which the call is being set-up, said mobile unit then storing the received identifying code in said memory and later using said stored, identifying code to generate said clearing signal indicating the on-hook status of said mobile unit.

2. A communication control system as claimed in claim 1, further comprising: a common control channel transmitting and receiving means at each base station for transmitting and receiving said identifying code on a carrier wave of a frequency common to all base stations.

* * * * *